(12) United States Patent
Xin et al.

(10) Patent No.: US 7,382,961 B2
(45) Date of Patent: Jun. 3, 2008

(54) FIBER TRANSITIONING

(75) Inventors: Xin Xin, Liberty Lake, WA (US);
James Patrick Jenkins, Liberty Lake, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 11/419,921

(22) Filed: May 23, 2006

(65) Prior Publication Data
US 2007/0280618 A1     Dec. 6, 2007

(51) Int. Cl.
*G02B 6/00* (2006.01)
(52) U.S. Cl. .................. 385/135; 385/134; 385/147
(58) Field of Classification Search ........ 385/134–137, 385/147
See application file for complete search history.

(56) References Cited

U.S. PATENT DOCUMENTS

| 4,770,357 | A | | 9/1988 | Sander et al. | |
|---|---|---|---|---|---|
| 4,995,688 | A | | 2/1991 | Anton et al. | |
| 5,142,606 | A | | 8/1992 | Carney et al. | |
| 5,335,349 | A | * | 8/1994 | Kutsch et al. | ............... 375/257 |
| 5,513,293 | A | | 4/1996 | Holland et al. | |
| 5,717,810 | A | | 2/1998 | Wheeler | |
| 5,758,002 | A | | 5/1998 | Walters | |
| 5,758,003 | A | | 5/1998 | Wheeler et al. | |
| 6,263,141 | B1 | | 7/2001 | Smith | |
| 6,418,262 | B1 | | 7/2002 | Puetz et al. | |
| 6,535,682 | B1 | | 3/2003 | Puetz et al. | |
| 6,711,339 | B2 | | 3/2004 | Puetz et al. | |
| 6,819,856 | B2 | * | 11/2004 | Dagley et al. | ............... 385/134 |
| 6,920,274 | B2 | | 7/2005 | Rapp et al. | |
| 2003/0223724 | A1 | | 12/2003 | Puetz et al. | |

FOREIGN PATENT DOCUMENTS

WO    WO9110927 A1    7/2005

\* cited by examiner

*Primary Examiner*—Kevin S. Wood
*Assistant Examiner*—John M Bedtelyon
(74) *Attorney, Agent, or Firm*—Lee & Hayes, PLLC

(57) ABSTRACT

A telecommunications system includes a first fiber management apparatus having a rear-trough architecture, a second fiber management apparatus having a front-access architecture, and a transition panel interposed between the first and second fiber management apparatuses, to transition fibers from the rear-trough architecture of the first fiber management apparatus to the front-access architecture of the second fiber management apparatus.

10 Claims, 5 Drawing Sheets

FIBER TRANSITIONING

TECHNICAL FIELD

The following disclosure relates generally to managing and organizing fibers, such as optical fibers. More specifically, the disclosure relates to transitioning fibers between a front-access system and a rear access system.

BACKGROUND

Optical fibers can be used to transmit large volumes of data and voice signals over relatively long distances, with little or no signal degradation. For this reason, optical fibers have become widely used in the telecommunication field. As the use of optical fibers has increased, various different systems have been developed for managing and organizing optical fibers.

Typical fiber management systems include a series of racks or frames having fiber management structures for storing the fibers or connecting the fibers to one or more other fibers and/or fiber optic devices, such as attenuators, connectors, switches, multiplexers, splitters/combiners, or splices. Slack storage panels have also been interspersed with the racks/frames to store extra slack in the fibers. The racks or frames typically have either a rear-trough architecture for routing fibers to the fiber management structures of the rack/frame from the back side, or a front-access architecture for routing fibers to the fiber management structures of the rack/frame from the front. Traditionally, rear-trough architecture and front-access architecture racks/frames have not been readily compatible with one another.

SUMMARY

Systems and apparatuses for transitioning optical fibers are disclosed. In one aspect, a system includes a transition panel interposed between a rear-trough architecture fiber management apparatus and a front-access architecture fiber management apparatus. The transition panel transitions fibers from the rear-trough architecture to the front-access architecture, so that rear-trough architecture and front-access architecture management apparatuses can be effectively used together.

In another aspect, a telecommunications apparatus for transitioning fibers between a front and back surface of the apparatus includes an elongated vertical body having substantially planar back and side surfaces. At least one of the side surfaces has cutouts formed along the vertical length of the side surface. The cutouts are spaced so as to align with troughs on a rear surface of an adjacent piece of telecommunications equipment. Multiple spools are coupled to the elongated vertical body for storing and managing fibers.

BRIEF DESCRIPTION OF THE DRAWINGS

The detailed description refers to the accompanying figures. In the figures, the left-most digit(s) of each reference number identifies the figure in which the reference number first appears. The use of the same reference numbers in different figures indicates similar or identical items.

DETAILED DESCRIPTION

This disclosure is directed to implementations including telecommunications systems and components thereof, such as transition panels for transitioning fibers between rear-trough architecture and front-access architecture racks. The implementations are described in the context of a rack-based system for managing optical fibers in a telecommunications infrastructure. However, the implementations described herein may be used in other environments and are applicable to other contexts. For example, the apparatuses and systems need not necessarily comprise racks, and may additionally or alternatively comprise, for example, wall-mounted or free standing frames, cabinets, panels, and the like. Thus, the discussion of rack-based systems herein is also applicable to systems using one or more of the foregoing types of structures singly in or in combination with one another. In addition, the apparatuses and systems may be used to manage fibers other than optical fibers, such as wires, Ethernet cables, coaxial cables, and/or other signal carrying fibers, and may be used in any environment in which such fibers are used.

Exemplary Telecommunications System

Figure 1:
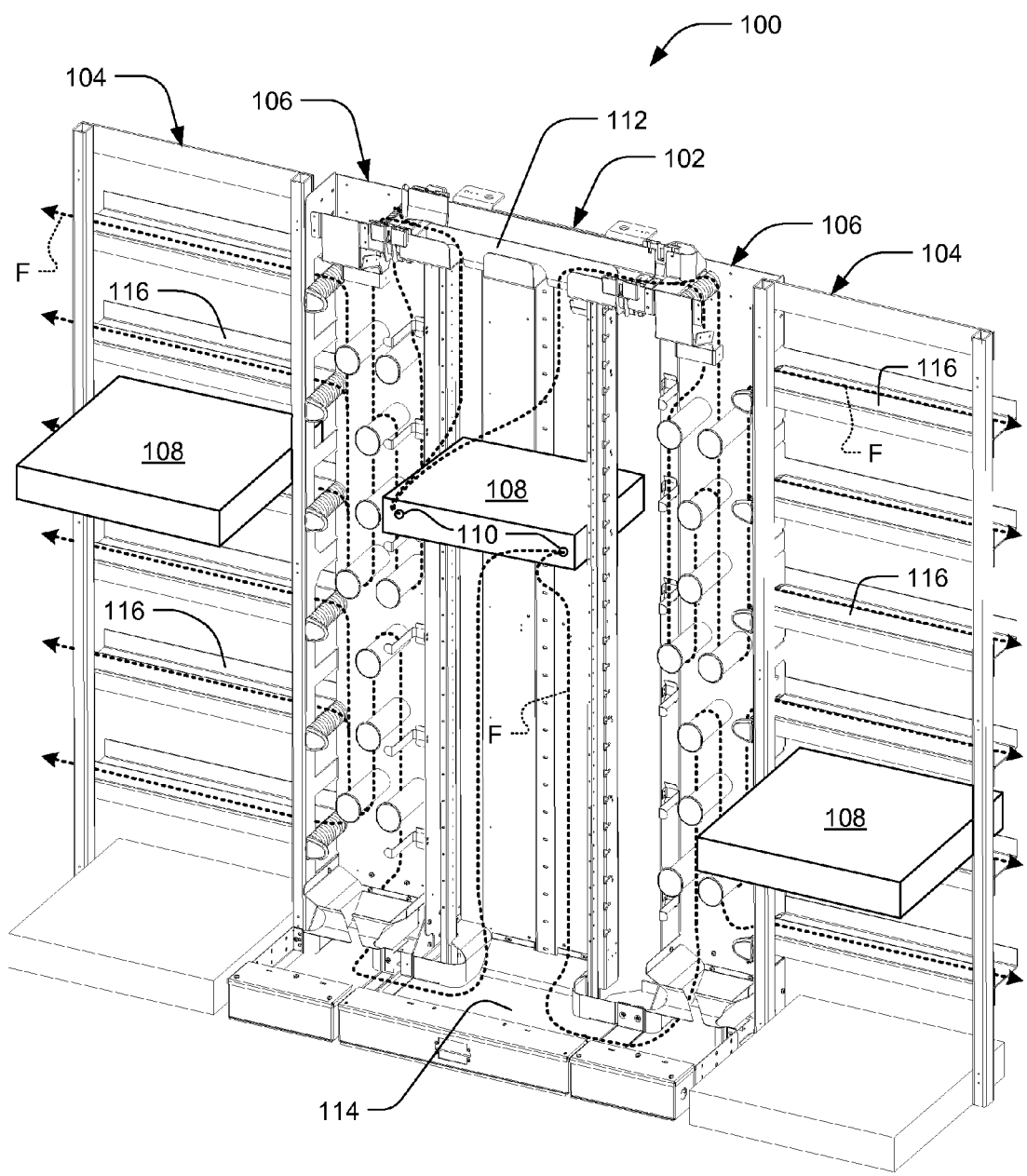
FIG. 1 is perspective view of one exemplary telecommunications system, including two transition panels, with one transition panel interposed between a front-access architecture rack and each of two rear-trough architecture racks.

FIG. 1 illustrates an exemplary telecommunications system 100 that transitions fibers F between a front-access rack 102 and two rear-trough racks 104. The system 100 allows telecommunications companies the flexibility to integrate an existing rear-trough fiber management system with one or more components of a front-access fiber management system and vice versa. This may be desirable for numerous reasons, such as where certain features are available on one type of system but not the other, where the fiber management system has limited accessibility from one or more directions, where one of the systems is more costly than the other, and the like.

The exemplary system 100 shown in FIG. 1 generally comprises a front-access rack 102 positioned laterally between two rear-trough racks 104. A transition panel 106 is interposed between the front-access rack 102 and each of the rear-trough racks 104 to transition the fibers from a front of the front-access rack 102 to the rear of the rear-trough rack 104.

One or more rack units 108 or other fiber management structures are mounted on the front-access rack 102 and each of the rear-trough racks 104. Only one rack unit 108 is shown mounted on each rack in FIG. 1 for clarity. However, it should be understood that any number of rack units can be mounted on each of the racks (or as discussed above, frames, cabinets, panels, etc.) as needed or desired. The rack units 108 may be virtually any size and shape and may include fiber management structures for storing the fibers F, or connecting the fibers F to one or more other fibers and/or fiber optic devices, such as attenuators, connectors, switches, multiplexers, splitters/combiners, splices, and the like.

On the front-access rack 102, fibers F typically enter and exit the rack units 108 at locations 110 on the front of the rack unit. From there, the fibers F can be routed to or from other rack units located above or below the rack unit 108 on the same rack, or to fiber routing troughs 112 and 114 located at the top and bottom of the front-access rack, respectively.

In contrast, on the rear-trough racks 104, fibers F enter and exit the rack units 108 at locations (not visible) on the back of the rack units. From there, the fibers F can be routed to or from other rack units located above or below the rack unit 108 on the same rack, or to rear fiber routing troughs 116 located on the back of the rear-trough racks 104 just below each rack unit mounting location.

From the fiber routing troughs 112, 114 of the front-access rack 102, fibers are routed to a lateral side of the front-access rack 102 to one of the transition panels 106, where they are transitioned from the front of the front-access rack 102 toward the rear for routing to rear fiber routing troughs 116 of one of the rear-trough racks 104. While the fibers are shown and described as being routed and transitioned from rack units on the front-access rack 102 to rear-trough racks 104, in practice the fibers can be routed and/or transitioned in either direction between front-access and rear-trough racks and systems.

Exemplary Transition Panel

Figure 2:
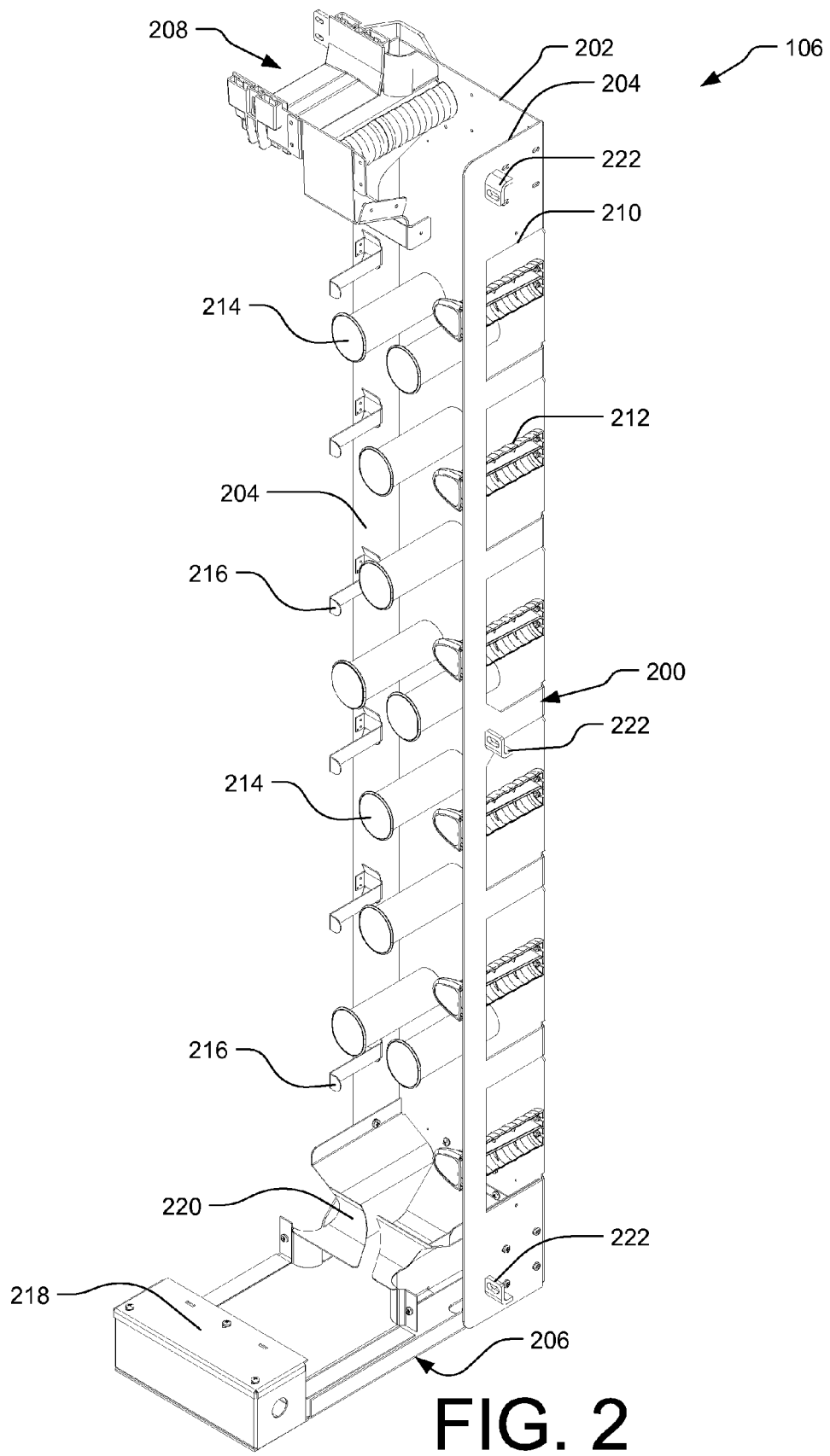
FIG. 2 is a perspective view of the right-hand transition panel of FIG. 1.
Figure 3:
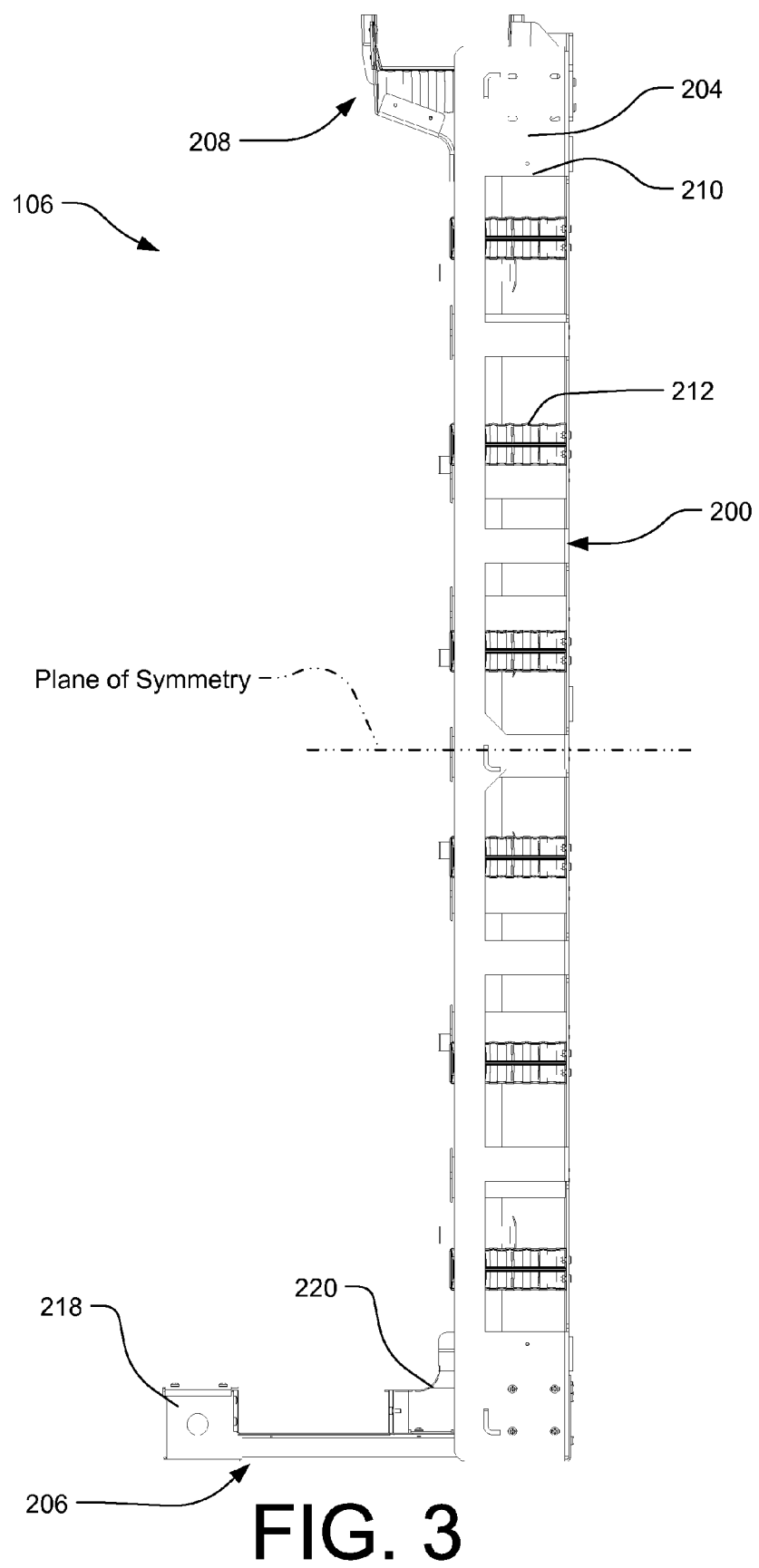
FIG. 3 is a right side view of the right-hand transition panel of FIG. 2.
Figure 4:
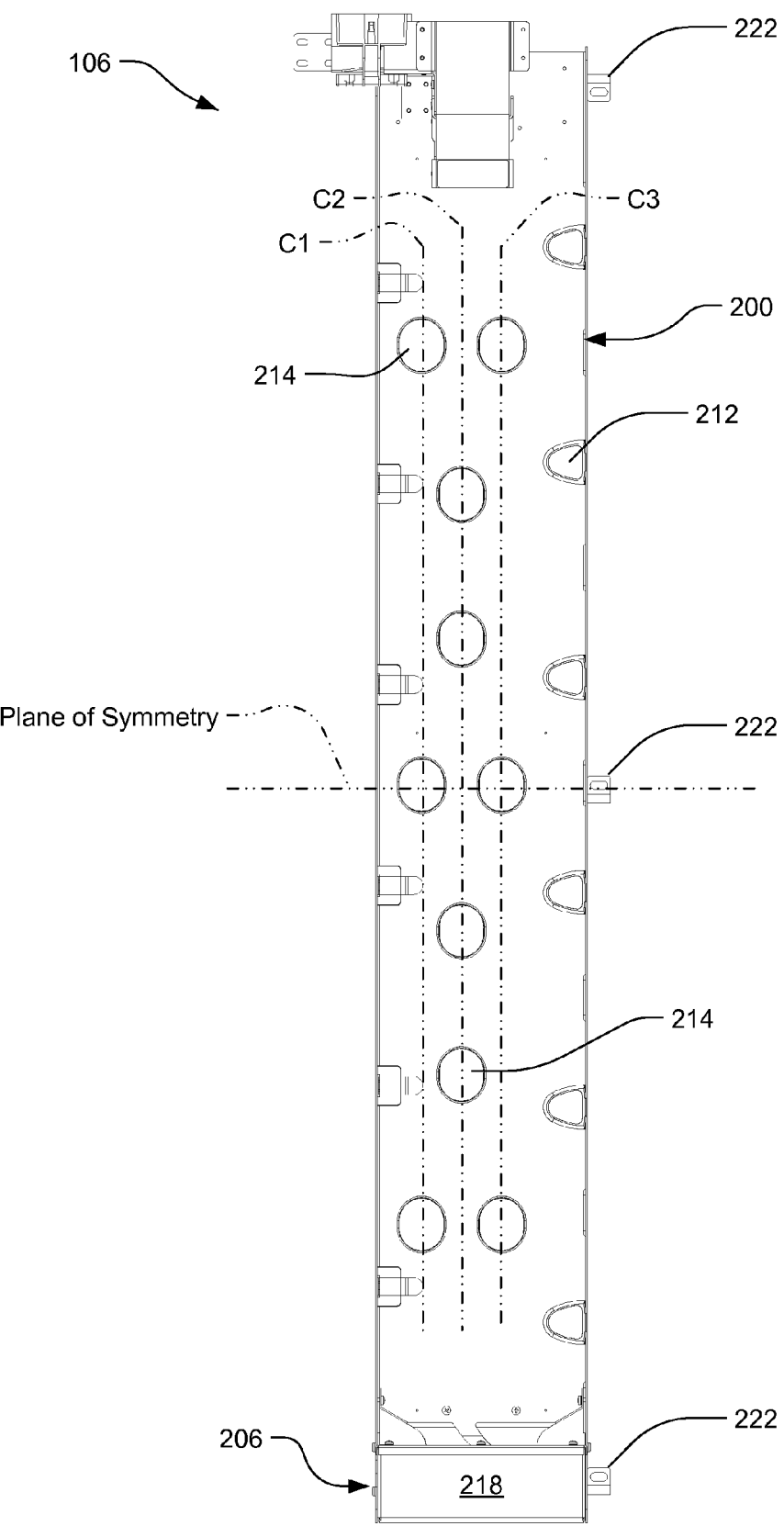
FIG. 4 is a front view of the right-hand transition panel of FIG. 2.

FIGS. 2-4 illustrate the exemplary transition panel 106 shown on the right side of FIG. 1. The fibers F have been omitted from these figures for clarity, but it should be understood that they could be routed and/or stored in numerous different configurations, including the manner shown in FIG. 1, for example.

FIG. 2 shows the transition panel 106 of FIG. 1 in more detail. The transition panel 106 comprises an elongated vertical body 200 having substantially planar back 202 and side 204 surfaces. A base 206 is coupled to the body 200 at a bottom end of the body 200 to support the body 200 in an upright position, and a top trough assembly 208 is coupled to a top end of the body 200 to route fibers to or from an adjacent front-access rack 102 or another adjacent piece of telecommunications equipment.

At least one of the side surfaces 204 of the body 200 has a plurality of cutouts 210 formed along its vertical length. The cutouts 210 are spaced vertically so as to align with rear troughs 116 of an adjacent rear-trough rack 104, such as those shown in FIG. 1, or another adjacent piece of telecommunications equipment. While only one side surface 204 is shown in FIG. 2 having cutouts 208, in some implementations both side surfaces 204 might have cutouts 210 formed therein.

A bend-limiting guide 212 is positioned in each of the cutouts 210 and aligned with the rear troughs 116 of an adjacent rear-trough rack 104 to help guide fibers F as they enter and exit the rear troughs 116. The bend-limiting guides 212 have a rounded profile that prevents the fibers F from being bent too sharply as they enter the rear troughs 116, which could damage the fibers. The bend-limiting guides 212 are shown in the figures as having generally semi-circular cross sections, but any other cross-sectional shape that protects the fibers F from being bent too sharply may be used.

FIGS. 3 and 4 are side and front views, respectively, of the transition panel 106. As best shown in these figures, the elongated vertical body 200 of the transition panel 106 is symmetric about a plane of symmetry extending through the vertical center and substantially normal to a vertical axis of the body 200. This allows a single body design to be used for either right- or left-handed transition panels (i.e., both of the transition panels shown in FIG. 1) by simply rotating the body 180 degrees vertically to the desired orientation, and then attaching the base 206 and the top trough assembly 208. In FIGS. 2-4, the body 200 is oriented for use as a right-handed (as viewed facing the panels of FIG. 1) transition panel.

A plurality of spools 214 is coupled to the elongated vertical body 200 for storing and managing slack fiber. Slack fiber may be wrapped around one or more of the spools 214 as shown in FIG. 1. In the implementation shown in FIGS. 2-4, the spools 214 are arranged in three vertical columns of spools C1, C2, and C3 (best shown in FIG. 4). The generally W-shaped formation created by the plurality of spools 214 allows for isolated extraction of individual fibers and prevents individual fibers from being "tied in" to the spool path.

The spools 214 protrude from a front side of the substantially planar back surface 202. In this implementation, the central column of spools C2 has more spools (four) than the other vertical columns of spools C1 and C3 (which each have three spools). However, the number and position of columns, and the number and position of spools in each column, may be varied depending on the dimensions of the transition panel 106, the desired slack storage pattern, the amount of slack storage desired, and other design considerations. Another exemplary spool arrangement is discussed below with respect to another exemplary transition panel shown in FIG. 5.

Fingers 216 are provided on at least one of the side panels 204 of the body 200. In the implementation shown, the fingers 216 are provided on the side opposite the side panel 204 with the cutouts 210. The fingers 216 help retain the slack fibers and prevent them from protruding into the interior of the front-access rack 102. The fingers 216 also help to limit the amount of slack fiber that can be wrapped around the spools 214 of the transition panel 106.

The base 206 has at its toe end (front end) a fiber channel 218 which can be used to route and protect fibers going to or from adjacent racks having corresponding fiber channels, such as the front-access rack 102 shown in FIG. 1. The base 206 also has one or more bend-limiting flutes 220 around which the fibers F are gradually bent as they are routed to or from the bottom fiber routing trough 114 of the front-access rack 102 shown in FIG. 1. The bend-limiting flutes 220 act in much the same manner as the bend-limiting guides 212 discussed above, to prevent the fibers F from being damaged by being bent too sharply.

The transition panel 106 also includes mounting flanges 222 which can be used to secure the transition panel 106 to an adjacent piece of telecommunications equipment, such as the front-access rack 102, shown in FIG. 1.

In one specific implementation, the transition panel 106 shown in FIGS. 2-4 is about 12 inches wide and is capable of transitioning and/or storing the slack of at least about two thousand fibers having a diameter of two millimeters each. Of course, the transition panel 106 could be configured to hold more or fewer fibers by, for example, changing the size and/or shape of the body, spools, or other components of the transition panel 106.

Alternative Exemplary Transition Panel

Figure 5:
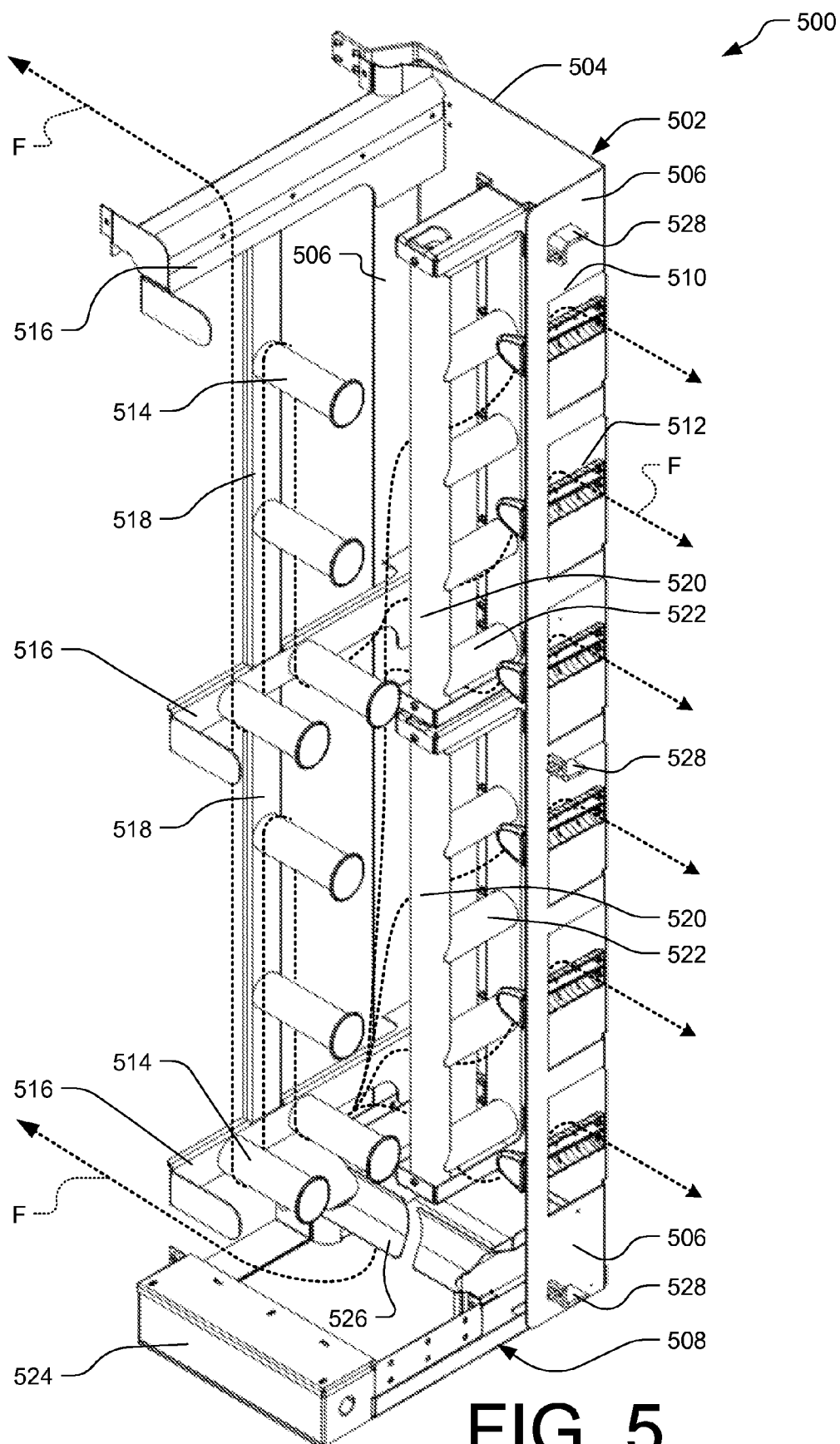
FIG. 5 is a perspective view of another exemplary transition panel usable with a telecommunications system.

FIG. 5 shows another exemplary transition panel 500 usable in a telecommunications system. One exemplary manner of routing fibers F through the transition panel 500 is shown in FIG. 5. However, it should be understood that fibers could be routed and/or stored in numerous different configurations, depending on the routing and storage needs of the surrounding telecommunications equipment.

Like the transition panel 106 shown in FIGS. 1-4, the transition panel 500 of this implementation comprises an elongated vertical body 502 with substantially planar back 504 and side 506 surfaces. A base 508 is coupled to a bottom end of the body 502 to support the body 502 in an upright position, and a top trough assembly (not shown) may be coupled to a top end of the body 502 to route fibers to or from another adjacent piece of telecommunications equipment.

Also like the transition panel 106 of FIGS. 1-4, at least one of the side surfaces 506 of the body 502 has a plurality of cutouts 510 formed along its vertical length. The cutouts 510 are spaced vertically so as to align with rear troughs of an adjacent piece of telecommunications equipment (not shown). While only one side surface 506 is shown in FIG. 5 having cutouts 510, in some implementations both side surfaces 506 might have cutouts 510 formed therein.

The transition panel 500 of FIG. 5 also includes a bend-limiting guide 512 positioned in each of the cutouts 510 and aligned with the rear troughs of an adjacent piece of telecommunications equipment to help guide fibers F as they enter and exit the rear troughs. The bend-limiting guides 512 are substantially the same as the bend-limiting guides 212 described above, and therefore will not be described further with respect to this implementation.

In contrast to the transition panel 106 of FIGS. 1-4, the transition panel 500 shown in FIG. 5 is not symmetric about a plane of symmetry. Thus, in this implementation, different bodies 502 are required for right- and left-handed transition panels 500, the right- and left-handed transition panels 500 being mirror images of each other. However, it should be understood that the body 502 of the transition panel 500 could be modified to be symmetric about a plane of symmetry if so desired.

A plurality of spools 514 is coupled to the elongated vertical body 502 for storing and managing slack fiber. Slack fiber F may be wrapped around one or more of the spools 514, as shown in FIG. 5. In this implementation, the spools 514 are again arranged in three vertical columns of spools, with the central column having more spools (four) than the other vertical columns of spools (which each have two spools). Again, the generally W-shaped formation created by the plurality of spools 514 in this implementation allows for isolated extraction of individual fibers and prevents individual fibers from being "tied in" to the spool path.

In this implementation, the spools 514 are coupled to the body 502 of the transition panel 500 by a plurality of side panels 516, which are coupled to one of the substantially planar side surfaces 506 of the body 502. The side panels 516 protrude substantially perpendicularly relative to the substantially planar back surface 504 of the body 502. One or more cross members 518 extend between and couple the side panels 516 together. Each of the spools 514 is coupled to one of the side panels 516 (either directly or indirectly via the cross member(s) 518), such that the spools are spaced from and extend substantially parallel to the substantially planar back surface 504 of the body 502. In one alternative, the cross member(s) 518 may be omitted or replaced by additional side panels extending from the side surface 506 at locations between and parallel to the shown side panels 516.

As in the previous implementation, the number and position of columns, and the number and position of spools in each column, may be varied depending on the dimensions of the transition panel 500, the desired slack storage pattern, the amount of slack storage desired, and other design considerations. Other exemplary spool arrangements will be apparent to those skilled in the art.

The transition panel 500 also has one or more elongated tubular members 520 coupled to the substantially planar back surface 504 by a plurality of tubular standoffs 522, such that the elongated tubular members 520 are spaced from and extend substantially parallel to the substantially planar back surface 504. While two separate tubular members 520 are shown, a single tubular member could instead extend substantially the whole length of the body 502, or three or more shorter tubular members could instead be used.

The base 508 has at its toe end a fiber channel 524 which can be used to route and protect fibers going to or from adjacent racks having corresponding fiber channels, such as the front-access rack 102 shown in FIG. 1. The base 508 also has one or more bend-limiting flutes 526 around which the fibers F are gradually bent as they are routed to or from the transition panel 500 from the bottom. The bend-limiting flutes 526 act in much the same manner as the bend-limiting guides 512 discussed above, to prevent the fibers F from being damaged by being bent too sharply.

The transition panel 500 also includes mounting flanges 528, which can be used to secure the transition panel 500 to an adjacent piece of telecommunications equipment, such as the front-access rack 102, shown in FIG. 1.

In one specific implementation, the transition panel 500 shown in FIG. 5 is about 16 inches wide and is capable of transitioning and/or storing the slack of at least about six thousand fibers having a diameter of two millimeters each. Of course, the transition panel 500 could be configured to hold more or fewer fibers by, for example, changing the size and/or shape of the body, spools, or other components of the transition panel 500.

The components of the transition panel can be made of any material having the desired combination of strength, cost, weight, electrical conductivity, and other material properties, and can be made by conventional manufacturing and assembling processes. Several suitable materials include, for example, metals, plastics, polymers, composites, and the like.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A telecommunications system comprising:
  a first fiber management apparatus having a rear-trough architecture, in which fibers are routed through troughs on the rear of the first fiber management apparatus;
  a second fiber management apparatus having a front-access architecture, in which fibers are routed and accessed from the front of the second fiber management apparatus; and
  a transition panel interposed between the first and second fiber management apparatuses, to transition fibers from the rear-trough architecture of the first fiber management apparatus to the front-access architecture of the second fiber management apparatus, the transition panel comprising:
    an elongated vertical body including substantially planar back and side surfaces; and
    an elongated tubular member coupled to the substantially planar back surface by a plurality of tubular standoffs, such that the elongated tubular member is spaced from and extends substantially parallel to the substantially planar back surface.

2. The system of claim 1, the transition panel comprising: a base coupled to the elongated vertical body at a bottom end of the elongated vertical body to support the elongated vertical body in an upright position, and at least one side surface of the elongated vertical body having a plurality of cutouts formed along the vertical length of the side surface.

3. The system of claim 2, the cutouts being spaced so as to line up with the troughs on a rear surface of the first fiber management apparatus.

4. The system of claim 2, the elongated vertical body being symmetric about a plane of symmetry extending through the vertical center and substantially normal to the vertical axis.

5. The system of claim 2, further comprising a plurality of spools coupled to the elongated vertical body, or at least one side panel, for storing and managing excess fiber.

6. The system of claim 5, the plurality of spools comprising three vertical columns of spools protruding from a front side of the substantially planar back surface, with a central one of the vertical columns of spools comprising more spools than the other vertical columns of spools.

7. The system of claim 5, further comprising a plurality of side panels coupled to one of the substantially planar side surfaces of the elongated vertical body and protruding substantially perpendicularly relative to the substantially planar back surface.

8. The system of claim 7, each of the spools being coupled to one of the side panels, such that the spools are spaced from and extend substantially parallel to the substantially planar back surface of the elongated vertical body.

9. The system of claim 1, wherein the transition panel is capable of transitioning two thousand fibers having a diameter of two millimeters each.

10. The system of claim 1, wherein the transition panel is capable of transitioning six thousand fibers having a diameter of two millimeters each.

* * * * *